United States Patent
Goncharov et al.

(10) Patent No.: US 12,205,620 B2
(45) Date of Patent: Jan. 21, 2025

(54) DYNAMIC DC FIELD COMPENSATOR FOR MAMR RECORDING HEAD

(71) Applicant: Western Digital Technologies, Inc., San Jose, CA (US)

(72) Inventors: Alexander Goncharov, Morgan Hill, CA (US); Muhammad Asif Bashir, San Jose, CA (US); Yunfei Ding, Fremont, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/228,523

(22) Filed: Jul. 31, 2023

(65) Prior Publication Data

US 2024/0321296 A1  Sep. 26, 2024

Related U.S. Application Data

(60) Provisional application No. 63/454,171, filed on Mar. 23, 2023.

(51) Int. Cl.
  *G11B 5/31* (2006.01)
  *G11B 5/00* (2006.01)

(52) U.S. Cl.
  CPC .......... *G11B 5/3133* (2013.01); *G11B 5/3143* (2013.01); *G11B 2005/0024* (2013.01)

(58) Field of Classification Search
  None
  See application file for complete search history.

(56) References Cited

U.S. PATENT DOCUMENTS

| | | | |
|---|---|---|---|
| 7,957,179 B2 * | 6/2011 | Ding | G11B 33/1493 365/158 |
| 7,982,996 B2 | 7/2011 | Smith et al. | |
| 8,582,240 B1 | 11/2013 | Chen et al. | |
| 9,064,508 B1 | 6/2015 | Shiimoto et al. | |
| 9,378,759 B2 | 6/2016 | Nagasaka et al. | |
| 10,109,302 B1 * | 10/2018 | Shinohara | G11B 5/10 |

(Continued)

OTHER PUBLICATIONS

Tagawa, Ikuya, "Negative Spin-Polarization Tri-Layer STO for MAMR", Journal of the Magnetics Society of Japan, Oct. 28, 2021, pp. 1-5.

(Continued)

*Primary Examiner* — William J Klimowicz
(74) *Attorney, Agent, or Firm* — PATTERSON + SHERIDAN, LLP

(57) ABSTRACT

The present disclosure generally relates to a magnetic recording system comprising a magnetic recording head. The magnetic recording head comprises a main pole, a shield, and a spintronic device disposed between the main pole and the shield. The spintronic device comprises a field generation layer (FGL) spaced a distance of about 2 nm to about 3 nm from the main pole, a first spacer layer disposed on the FGL, a spin torque layer (STL) disposed on the first spacer layer, a second spacer layer disposed on the STL, and a negative polarization layer (NPL) disposed between the second spacer layer and the shield. The spintronic device has a length of about 17 nm to about 21. During operation, the STL has a magnetization precession of about 16 degrees to about 170 degrees, and the FGL has a magnetization precession of about 60 degrees to about 70 degrees.

20 Claims, 9 Drawing Sheets

(56) References Cited

U.S. PATENT DOCUMENTS

| | | | | |
|---|---|---|---|---|
| 10,121,497 | B1* | 11/2018 | Takahashi | G11B 5/235 |
| 10,636,441 | B2 | 4/2020 | Goncharov et al. | |
| 10,839,832 | B1* | 11/2020 | Goncharov | G11B 5/315 |
| 10,937,450 | B1* | 3/2021 | Kawasaki | G11B 5/1278 |
| 11,211,083 | B1* | 12/2021 | Zheng | G11B 5/315 |
| 11,257,514 | B2* | 2/2022 | Freitag | G11B 5/3133 |
| 11,289,118 | B1* | 3/2022 | Kaiser | G11B 5/1278 |
| 11,568,891 | B1* | 1/2023 | Chen | G11B 5/3133 |
| 2016/0086623 | A1* | 3/2016 | Nagasaka | G11B 5/235 |
| | | | | 360/125.3 |
| 2016/0218728 | A1 | 7/2016 | Zhu | |
| 2021/0407534 | A1* | 12/2021 | Freitag | G11B 5/314 |
| 2022/0148619 | A1* | 5/2022 | Freitag | G11B 5/315 |
| 2024/0029759 | A1* | 1/2024 | Chen | G11B 5/3146 |

OTHER PUBLICATIONS

"Microwave-assisted Magnetic Recording Technology for HDDs Achieving Higher Recording Density", Toshiba, pp. 1-5, Copyright Year 2020.

\* cited by examiner

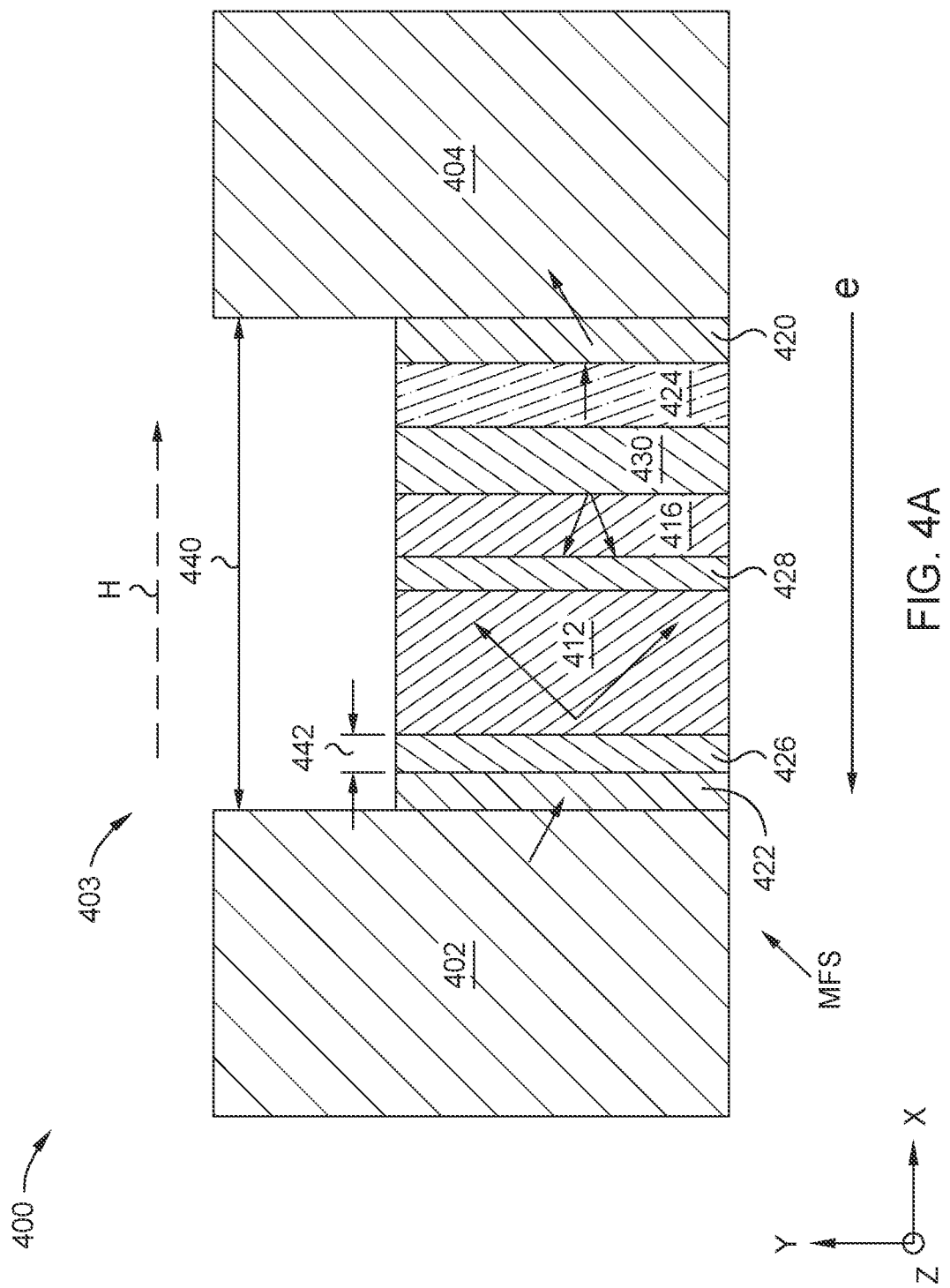

DYNAMIC DC FIELD COMPENSATOR FOR MAMR RECORDING HEAD

CROSS-REFERENCE TO RELATED APPLICATIONS

This application claims benefit of U.S. provisional patent application Ser. No. 63/454,171, filed Mar. 23, 2023, which is herein incorporated by reference.

BACKGROUND OF THE DISCLOSURE

Field of the Disclosure

Embodiments of the present disclosure generally relate to a magnetic recording system comprising a magnetic recording head having a spintronic device.

Description of the Related Art

Over the past few years, various magnetic recording methods have been studied to improve the areal density of a magnetic media device, such as a hard disk drive (HDD). Magnetic recording heads, or write heads, in HDDs can have a significant effect on the overall performance and reliability of the recording device. Magnetic recording heads may be designed to achieve specific advantages, such as improved performance, but may consequently have a negative impact on other characteristics, such as decreased reliability.

For example, microwave-assisted magnetic recording (MAMR) is one type of energy-assisted recording technology to improve the recording density of a magnetic recording medium, such as a HDD. In MAMR, a spin torque oscillator (STO) device or a spintronic device is located next to or near the write element such that in operation the STO enhances the write field of the write pole. In addition, the STO produces a high-frequency AC field, such as in a microwave frequency band, that reduces an effective coercivity of a magnetic recording medium used to store data and allows writing of the magnetic recording medium at lower magnetic writing fields emanated from the write pole. Thus, higher recording density of the magnetic recording medium may be achieved by MAMR technology.

However, in order to enhance the AC field produced in such STO or spintronic devices, the thickness of various layers within the STO devices need to be increased, such as field generation layers (FGLs). Increasing the thickness of FGLs also increases the perpendicular AC component (Hpac) when writing data, which negatively impacts the overall recording device and causes unwanted cross-talk or spin torque to be generated. The increased thicknesses further increase the overall length of the STO, further decreasing the overall performance.

Therefore, there is a need in the art for an improved STO or spintronic device configured to enhance the produced AC field without also increasing the perpendicular AC component.

SUMMARY OF THE DISCLOSURE

The present disclosure generally relates to a magnetic recording system comprising a magnetic recording head. The magnetic recording head comprises a main pole, a shield, and a spintronic device disposed between the main pole and the shield. The spintronic device comprises a field generation layer (FGL) spaced a distance of about 2 nm to about 3 nm from the main pole, a first spacer layer disposed on the FGL, a spin torque layer (STL) disposed on the first spacer layer, a second spacer layer disposed on the STL, and a negative polarization layer (NPL) disposed between the second spacer layer and the shield. The spintronic device has a length of about 17 nm to about 21. During operation, the STL has a magnetization precession of about 16 degrees to about 170 degrees, and the FGL has a magnetization precession of about 60 degrees to about 70 degrees.

In one embodiment, a magnetic recording head comprises a main pole, a shield, and a spintronic device is disposed between a main pole and a shield, the spintronic device comprising a field generation layer (FGL) spaced a distance of about 2 nm to about 3 nm from the main pole, a first spacer layer disposed in contact with the FGL, a spin torque layer (STL) disposed in contact with the first spacer layer, and a negative polarization layer (NPL) disposed between the STL and the shield, the NPL comprising a negative polarization material.

In another embodiment, a magnetic recording head comprises a main pole, a shield disposed adjacent to the main pole, and a spintronic device disposed between the main pole and the shield, the spintronic device comprising: a first spacer layer disposed adjacent to the main pole, a field generation layer (FGL) disposed on the first spacer layer, a second spacer layer disposed on the FGL, a spin torque layer (STL) disposed on the second spacer layer, a third spacer layer disposed on the STL, and a negative polarization layer (NPL) disposed between the third spacer layer and the shield, the NPL comprising FeCr, wherein the spintronic device has a length of about 17 nm to about 21 nm.

In yet another embodiment, a magnetic recording head comprises a main pole, a shield disposed adjacent to the main pole, and a spintronic device disposed between the main pole and the shield, the spintronic device comprising: a first notch disposed on the main pole, a negative polarization layer (NPL) disposed on the first notch, the NPL comprising FeCr, a first spacer layer disposed on the NPL, a spin torque layer (STL) disposed on the first spacer layer, a second spacer layer disposed on the STL, a field generation layer (FGL) disposed on the second spacer layer, a third spacer layer disposed on the FGL, and a second notch disposed between and in contact with the third spacer layer and the shield.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 4A-4D illustrate spintronic devices, according to various embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a magnetic recording system comprising a magnetic recording head. The magnetic recording head comprises a main pole, a shield, and a spintronic device disposed between the main pole and the shield. The spintronic device comprises a field generation layer (FGL) spaced a distance of about 2 nm to about 3 nm from the main pole, a first spacer layer disposed on the FGL, a spin torque layer (STL) disposed on the first spacer layer, a second spacer layer disposed on the STL, and a negative polarization layer (NPL) disposed between the second spacer layer and the shield. The spintronic device has a length of about 17 nm to about 21. During operation, the STL has a magnetization precession of about 16 degrees to about 170 degrees, and the FGL has a magnetization precession of about 60 degrees to about 70 degrees.

Figure 1:
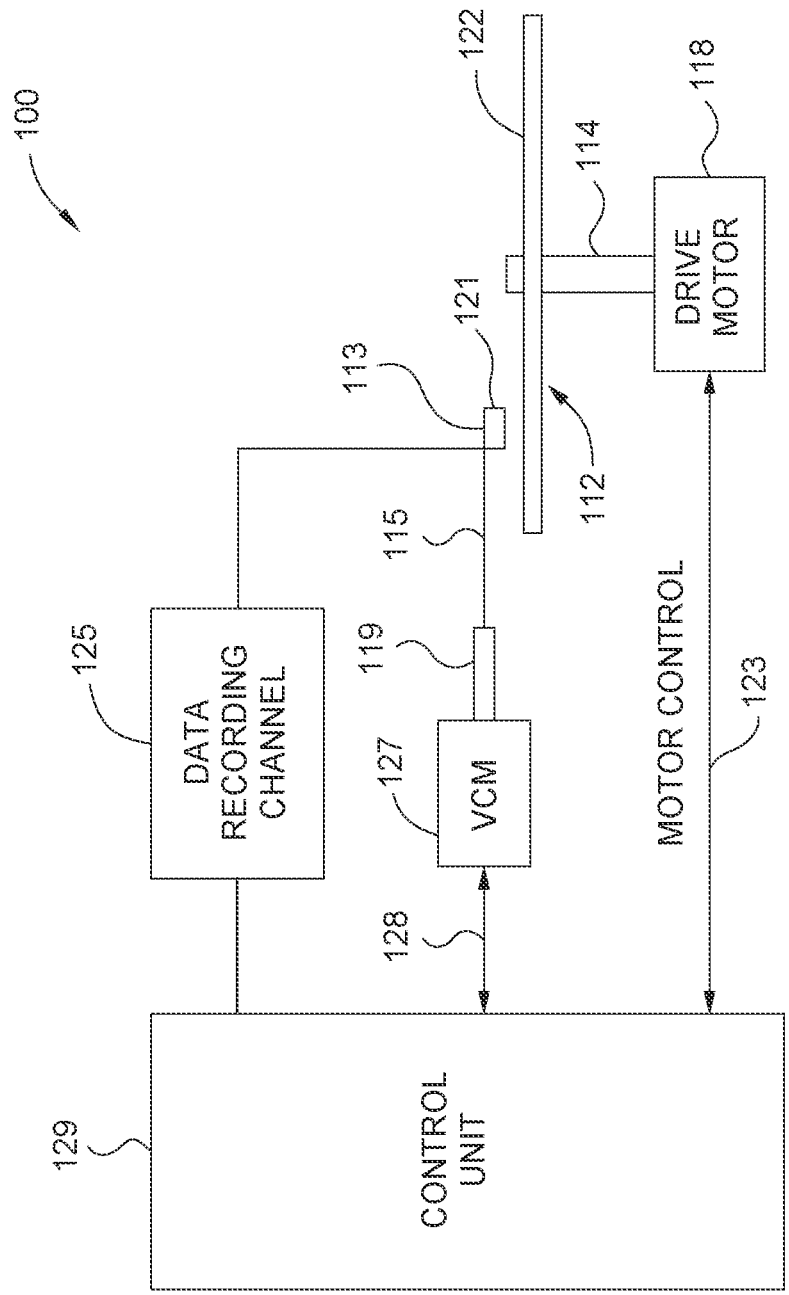
FIG. 1 illustrates a disk drive embodying this disclosure.

FIG. 1 is a schematic illustration of a magnetic recording device 100, according to one implementation. The magnetic recording device 100 includes a magnetic recording head, such as a write head. The magnetic recording device 100 is a magnetic media drive, such as a hard disk drive (HDD). Such magnetic media drives may be a single drive/device or include multiple drives/devices. For the ease of illustration, a single disk drive is shown as the magnetic recording device 100 in the implementation illustrated in FIG. 1. The magnet recording device 100 (e.g., a disk drive) includes at least one rotatable magnetic disk 112 supported on a spindle 114 and rotated by a drive motor 118. The magnetic recording on each rotatable magnetic disk 112 is in the form of any suitable patterns of data tracks, such as annular patterns of concentric data tracks on the rotatable magnetic disk 112.

At least one slider 113 is positioned near the rotatable magnetic disk 112. Each slider 113 supports a head assembly 121. The head assembly 121 includes one or more magnetic recording heads (such as read/write heads), such as a write head including a spintronic device. As the rotatable magnetic disk 112 rotates, the slider 113 moves radially in and out over the disk surface 122 so that the head assembly 121 may access different tracks of the rotatable magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1 may be a voice coil motor (VCM). The VCM includes a coil movable within a fixed magnetic field, the direction and speed of the coil movements being controlled by the motor current signals supplied by a control unit 129.

The head assembly 121, such as a write head of the head assembly 121, includes a media facing surface (MFS) such as an air bearing surface (ABS) that faces the disk surface 122. During operation of the magnetic recording device 100, the rotation of the rotatable magnetic disk 112 generates an air or gas bearing between the slider 113 and the disk surface 122 which exerts an upward force or lift on the slider 113. The air or gas bearing thus counter-balances the slight spring force of suspension 115 and supports the slider 113 off and slightly above the disk surface 122 by a small, substantially constant spacing during operation.

The various components of the magnetic recording device 100 are controlled in operation by control signals generated by control unit 129, such as access control signals and internal clock signals. The control unit 129 includes logic control circuits, storage means and a microprocessor. The control unit 129 generates control signals to control various system operations such as drive motor control signals on a line 123 and head position and seek control signals on a line 128. The control signals on line 128 provide the desired current profiles to optimally move and position slider 113 to the desired data track on rotatable magnetic disk 112. Write and read signals are communicated to and from the head assembly 121 by way of recording channel 125. In one embodiment, which can be combined with other embodiments, the magnetic recording device 100 may further include a plurality of media, or disks, a plurality of actuators, and/or a plurality number of sliders.

Figure 2:
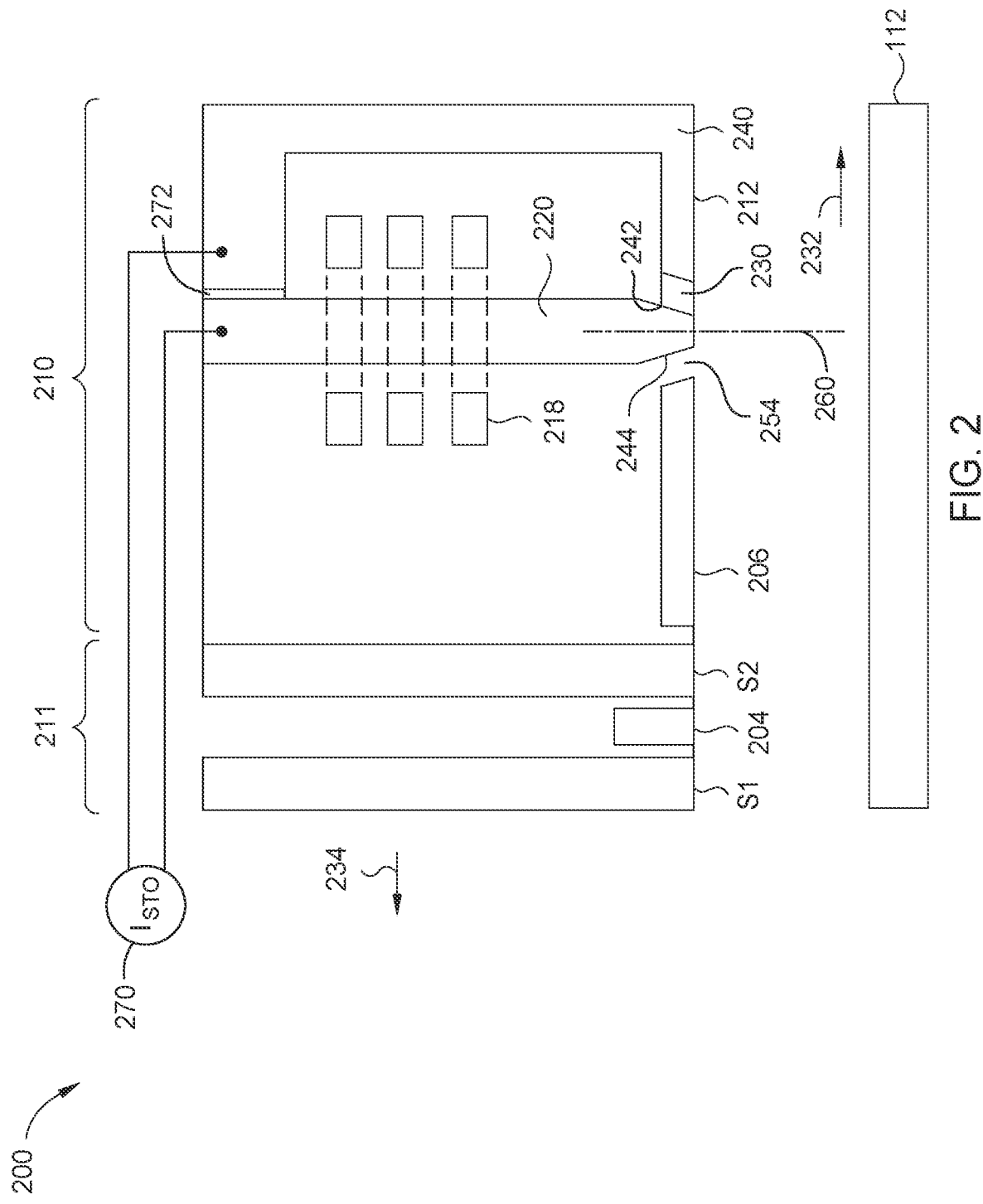
FIG. 2 is a fragmented, cross-sectional side view through the center of a read/write head facing a magnetic media, according to one embodiment.

FIG. 2 is a schematic illustration of a cross sectional side view of a head assembly 200 facing the rotatable magnetic disk 112 shown in FIG. 1 or other magnetic storage medium, according to one implementation. The head assembly 200 may correspond to the head assembly 121 described in FIG. 1. The head assembly 200 includes a media facing surface (MFS) 212, such as an air bearing surface (ABS), facing the rotatable magnetic disk 112. As shown in FIG. 2, the rotatable magnetic disk 112 relatively moves in the direction indicated by the arrow 232 and the head assembly 200 relatively moves in the direction indicated by the arrow 233.

In one embodiment, which can be combined with other embodiments, the head assembly 200 includes a magnetic read head 211. The magnetic read head 211 may include a sensing element 204 disposed between shields S1 and S2. The sensing element 204 is a magnetoresistive (MR) sensing element, such an element exerting a tunneling magneto-resistive (TMR) effect, a magneto-resistance (GMR) effect, an extraordinary magneto-Resistive (EMR) effect, or a spin torque oscillator (STO) effect. The magnetic fields of magnetized regions in the rotatable magnetic disk 112, such as perpendicular recorded bits or longitudinal recorded bits, are detectable by the sensing element 204 as the recorded bits.

The head assembly 200 includes a write head 210. In one embodiment, which can be combined with other embodiments, the write head 210 includes a main pole 220, a leading shield 206, a trailing shield (TS) 240, and a spintronic device 230 disposed between the main pole 220 and the TS 240. The main pole 220 serves as a first electrode.

Each of the main pole 220, the spintronic device 230, the leading shield 206, and the trailing shield (TS) 240 has a front portion at the MFS.

The main pole 220 includes a magnetic material, such as CoFe, CoFeNi, or FeNi, other suitable magnetic materials. In one embodiment, which can be combined with other embodiments, the main pole 220 includes small grains of magnetic materials in a random texture, such as body-centered cubic (BCC) materials formed in a random texture. In one example, a random texture of the main pole 220 is formed by electrodeposition. The write head 210 includes a coil 218 around the main pole 220 that excites the main pole 220 to produce a writing magnetic field for affecting a magnetic recording medium of the rotatable magnetic disk 112. The coil 218 may be a helical structure or one or more sets of pancake structures.

In one embodiment, which can be combined with other embodiments, the main pole 220 includes a trailing taper 242 and a leading taper 244. The trailing taper 242 extends from a location recessed from the MFS 212 to the MFS 212. The leading taper 244 extends from a location recessed from the MFS 212 to the MFS 212. The trailing taper 242 and the leading taper 244 may have the same degree or different degree of taper with respect to a longitudinal axis 260 of the main pole 220. In one embodiment, which can be combined with other embodiments, the main pole 220 does not include the trailing taper 242 and the leading taper 244. In such an embodiment, the main pole 220 includes a trailing side and a leading side in which the trailing side and the leading side are substantially parallel.

The TS 240 includes a magnetic material, such as FeNi, or other suitable magnetic materials, serving as a second electrode and return pole for the main pole 220. The leading shield 206 may provide electromagnetic shielding and is separated from the main pole 220 by a leading gap 254.

In some embodiments, the spintronic device 230 is positioned proximate the main pole 220 and reduces the coercive force of the magnetic recording medium, so that smaller writing fields can be used to record data. In such embodiments, an electron current is applied to spintronic device 230 from a current source 270 to produce a microwave field. The electron current may include direct current (DC) waveforms, pulsed DC waveforms, and/or pulsed current waveforms going to positive and negative voltages, or other suitable waveforms. In other embodiments, an electron current is applied to spintronic device 230 from a current source 270 to produce a high frequency alternating current (AC) field to the media.

In one embodiment, which can be combined with other embodiments, the spintronic device 230 is electrically coupled to the main pole 220 and the TS 240. The main pole 220 and the TS 240 are separated in an area by an insulating layer 272. The current source 270 may provide electron current to the spintronic device 230 through the main pole 220 and the TS 240. For direct current or pulsed current, the current source 270 may flow electron current from the main pole 220 through the spintronic device 230 to the TS 240 or may flow electron current from the TS 240 through the spintronic device 230 to the main pole 220 depending on the orientation of the spintronic device 230. In one embodiment, which can be combined with other embodiments, the spintronic device 230 is coupled to electrical leads providing an electron current other than from the main pole 220 and/or the TS 240.

Figure 3A:
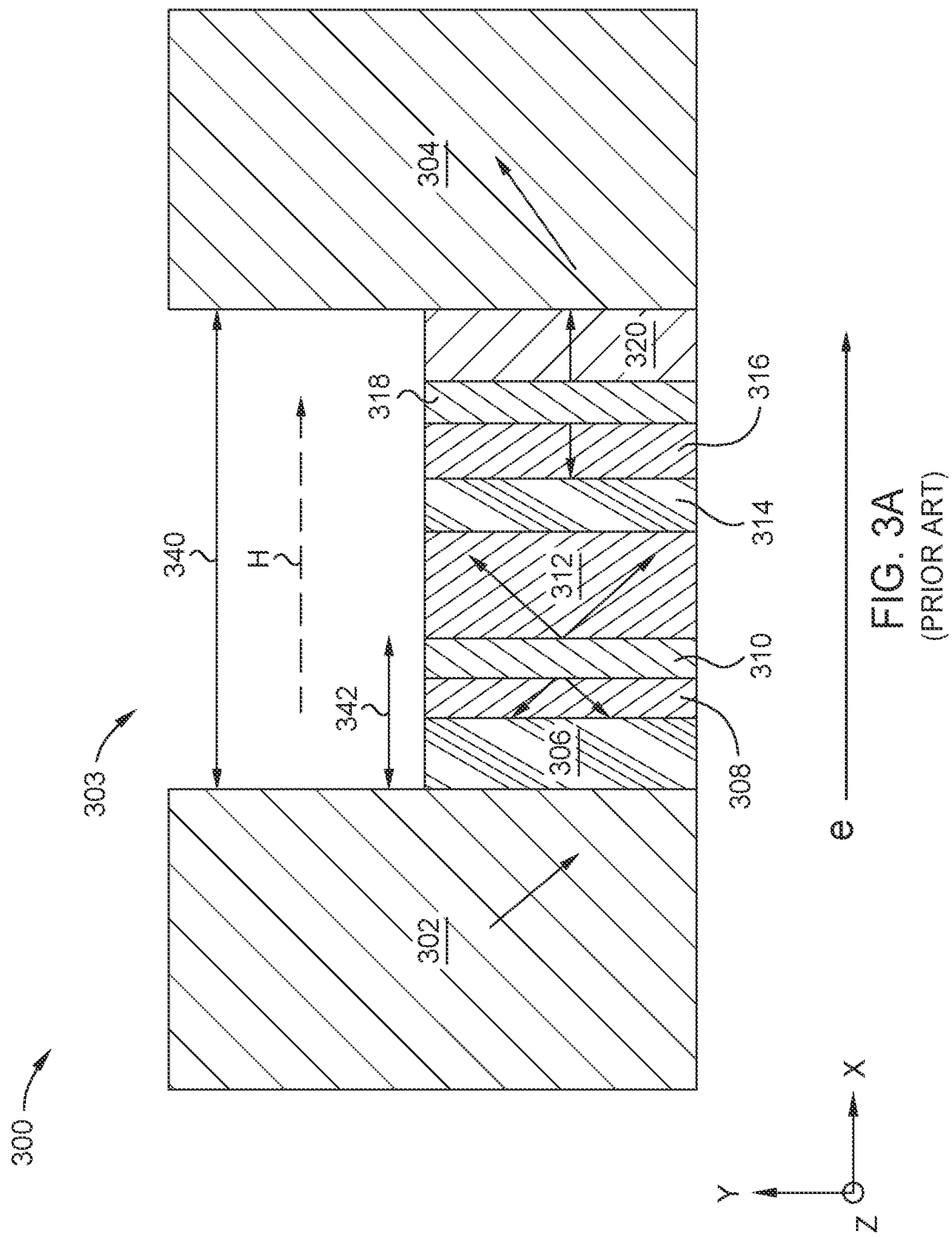
FIGS. 3A-3B illustrate exemplary conventional spintronic devices.
Figure 3B:
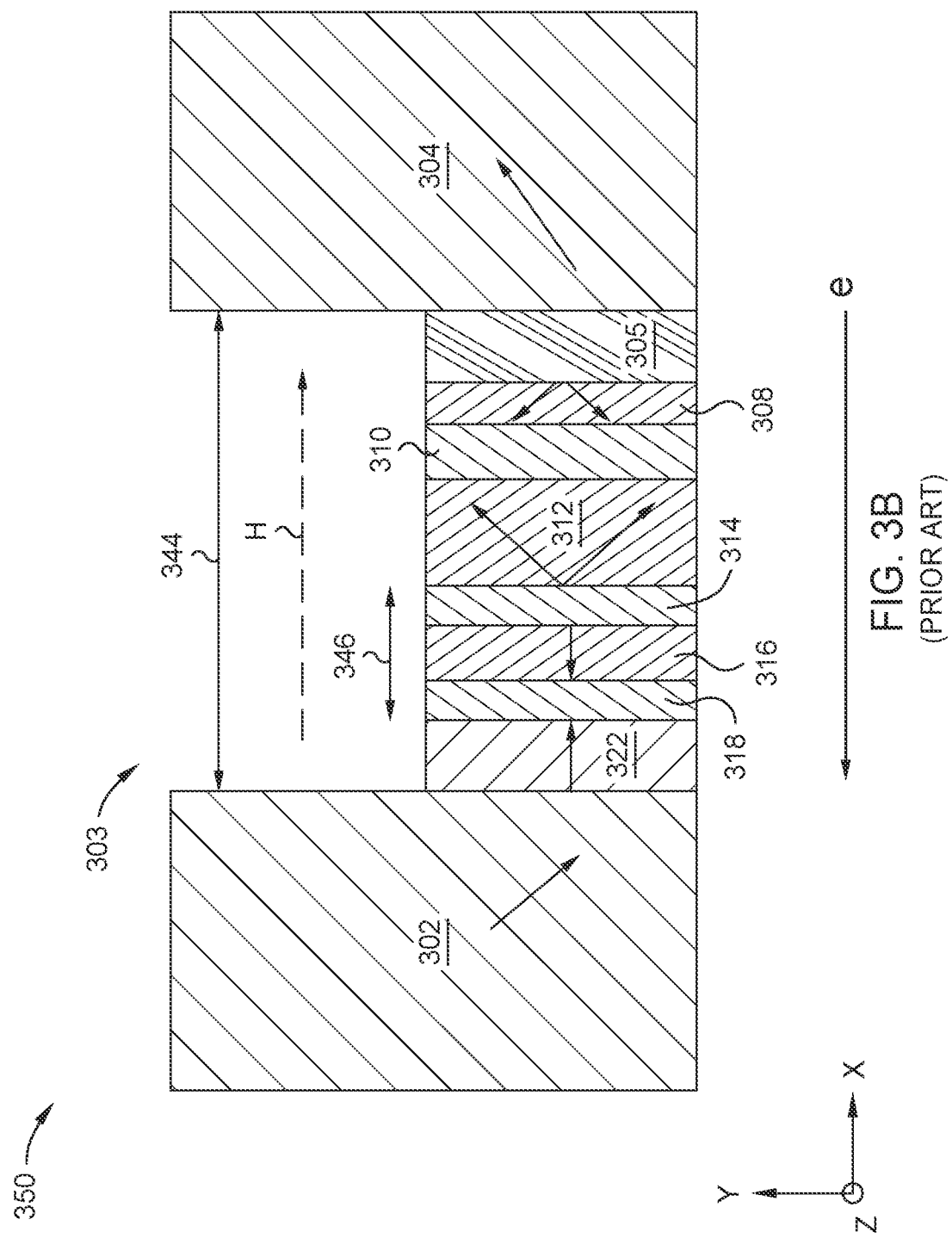

FIGS. 3A-3B illustrate exemplary conventional spintronic devices 300, 350. FIG. 3A illustrates a forward conventional spintronic device 300, and FIG. 3B illustrates a reverse conventional spintronic device 350. Each spintronic device 300, 350 is disposed in a trailing gap 303 disposed between a main pole 302 and a trailing shield 304. The arrows shown within each layer of the spintronic devices 300, 350 represent the magnetization direction of each layer. Both of these devices provide assisting recording effects via both a oscillating field generation layer for the aforementioned AC-field MAMR effect at the media to lower the media coercivity ("microwave assist" below) and a spin torque layer that is switched against a gap field to improve the write field experienced by the magnetic recording media ("DC assist" below).

In the spintronic device 300, a seed layer 306 is disposed on the main pole (MP) 302, a spin polarization layer (SPL) 308 is disposed on the seed layer 306, a first spacer layer 310 is disposed on the SPL 308, a field generation layer (FGL) 312 is disposed on the first spacer layer 310, a spin scattering (SS) layer 314 is disposed on the FGL 312, a spin torque layer (STL) 316 is disposed on the SS layer 314, a second spacer layer 318 is disposed on the STL 316, and a trailing shield notch 320 is disposed in contact with the second spacer layer 318 and the trailing shield 304. In some embodiments, the trailing shield notch 320 may be considered part of the trailing shield 304. During operation, when current is applied, electrons (e) flow from the main pole 302, through the spintronic device 300, to the trailing shield 304. Similarly, the magnetic gap field (H) is directed from the main pole 302, through the spintronic device 300, to the trailing shield 304.

The spintronic device 300 has a length 340 in the x-direction from the main pole 302 to the trailing shield 304 of about 25 nm to about 28 nm. The FGL 312 is spaced a distance 342 from the main pole 302 in the x-direction of about 10 nm. Because the FGL 312 is disposed towards the center of the spintronic device 300, the FGL 312 is less effective. As such, the location of the FGL 312 is not optimal.

In the spintronic device 350, a main pole notch 322 is disposed on the main pole 302, the second spacer layer 318 is disposed on the main pole notch 322, the STL 316 is disposed on the second spacer layer 318, the SS layer 314 is disposed on the STL 316, the FGL 312 is disposed on the SS layer 314, the first spacer layer 310 is disposed on the FGL 312, the SPL 308 is disposed on the first spacer layer 310, and a cap layer 305 is disposed in contact with the SPL 308 and the trailing shield 304. In some embodiments, the main pole notch 322 may be considered part of the main pole 302. During operation, when current is applied, electrons (e) flow from the trailing shield 304, through the spintronic device 350, to the main pole 302. The magnetic gap field (H) is directed from the main pole 302, through the spintronic device 300, to the trailing shield 304.

The spintronic device 350 has a length 344 in the x-direction from the main pole 302 to the trailing shield 304 of about 25 nm to about 28 nm. The FGL 312 is spaced a distance 346 from the main pole 302 in the x-direction of about 10 nm. Because the FGL 312 is disposed towards the center of the spintronic device 350, the FGL 312 is less effective. As such, the location of the FGL 312 is unfavorable.

In both spintronic devices 300 and 350, the seed layer 306 and the cap layer 305 may each individually comprise a non-magnetic material, such as Cr, Ru, NiFeTa, and/or NiAl, and have a thickness in the x-direction of about 2 nm to about 6 nm. The first spacer layer 310 and the second spacer layer 318 may each individually comprise a non-magnetic layer, such as Cu, and have a thickness in the x-direction of about 2 nm to about 3 nm. The SS layer 314 comprises Cr and has a thickness in the x-direction of about 3 nm to about 5 nm. The SPL 308 comprises a magnetic material, such as CMG, NiFe, and/or CoFe, and has a thickness in the x-direction of about 1 nm to about 2 nm. The FGL 312 comprises a magnetic material, such as CoFe and/or a Co/Fe multilayer, and has a thickness in the x-direction of about 5 nm to about 10 nm. The STL 316 comprises a magnetic material, such as CMG and/or NiFe, and has a thickness in the x-direction of about 3 nm to about 6 nm. The trailing shield notch 320 comprises a magnetic material, such as CoFeNi or other suitable magnetic materials, and has a thickness in the x-direction of about 2 nm to about 10 nm.

Each spintronic device 300 and 350 comprises three magnetic layers, the FGL 312 and the SPL 308 for microwave assist, and the STL 316 from direct current (DC) assist. As such, the lengths 340, 344 of each spintronic device 300, 350 is larger than desired in order to accommodate the three magnetic layers 312, 308, 316. Furthermore, torque from the FGL 312 degrades the STL 316, and vice versa. To help prevent torque from degrading the FGL 312 and/or the STL 316, the SS layer 314 is required to be disposed between the FGL 312 and the STL 316.

FIGS. 4A-4D illustrate cross-sectional view of spintronic devices 400, 425, 450, 475, according to various embodiments. Each spintronic device 400, 425, 450, and 475 may independently be the spintronic device 230 of FIG. 2, and each spintronic device 400, 425, 450, and 475 is disposed in a gap 403 between a main pole 402, such as the main pole 220 of FIG. 2, and a shield 404, such as the trailing shield 240 of FIG. 2, a leading shield 206 of FIG. 2, or a side shield (not shown). Each spintronic device 400, 425, 450, 475 may individually be a part of the disk drive 100 of FIG. 1, or a part of the read/write head 200 of FIG. 2. Each spintronic device 400, 425, 450, 475 may be referred to herein as a spin torque oscillator (STO) or STO stack. It is noted as the trailing shield is used as an example to illustrate the various embodiments, and the spintronic device can be between the main pole and other shields in the recording head, such as leading shield and side shields.

Figure 4B:
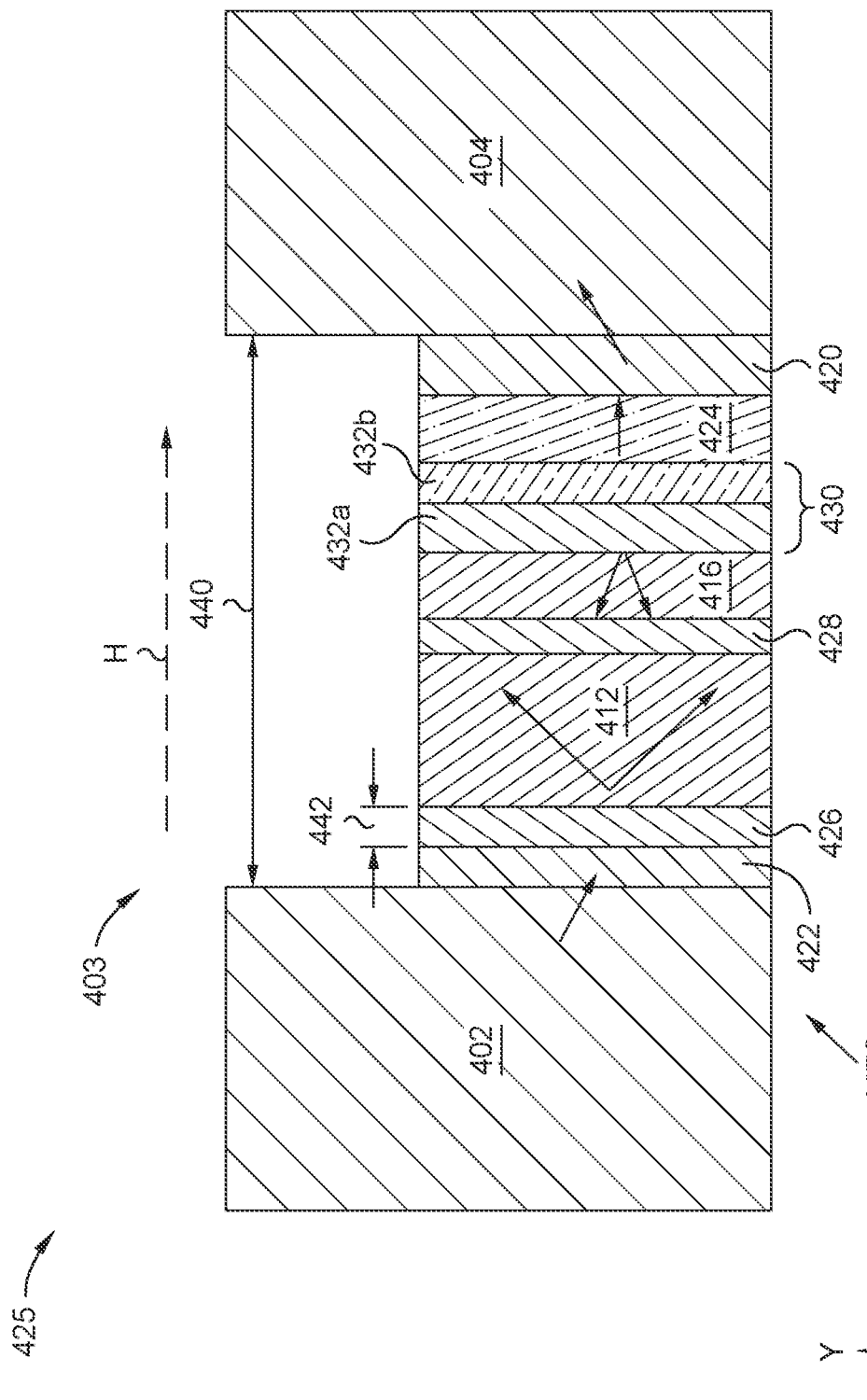
Figure 4C:
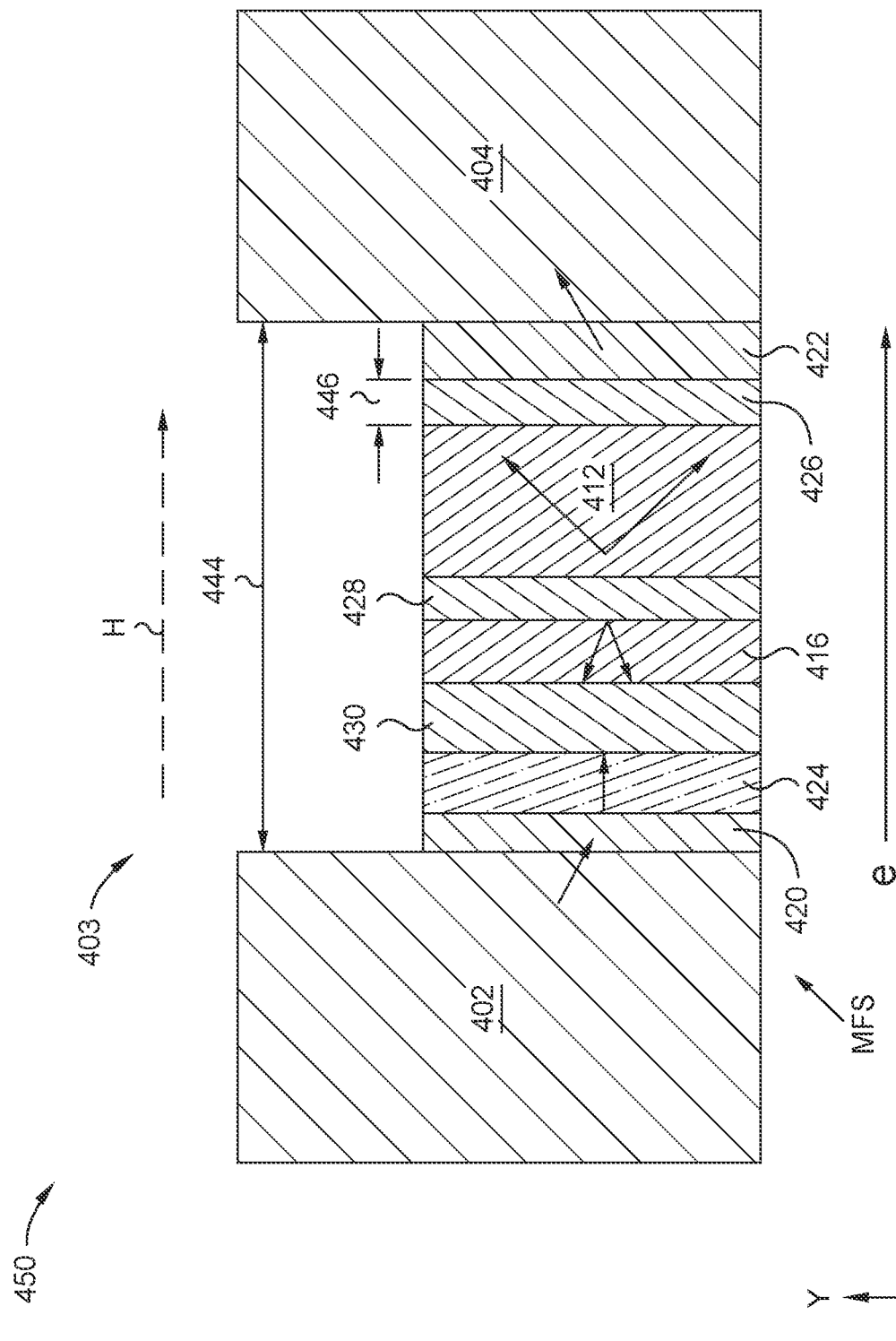
Figure 4D:
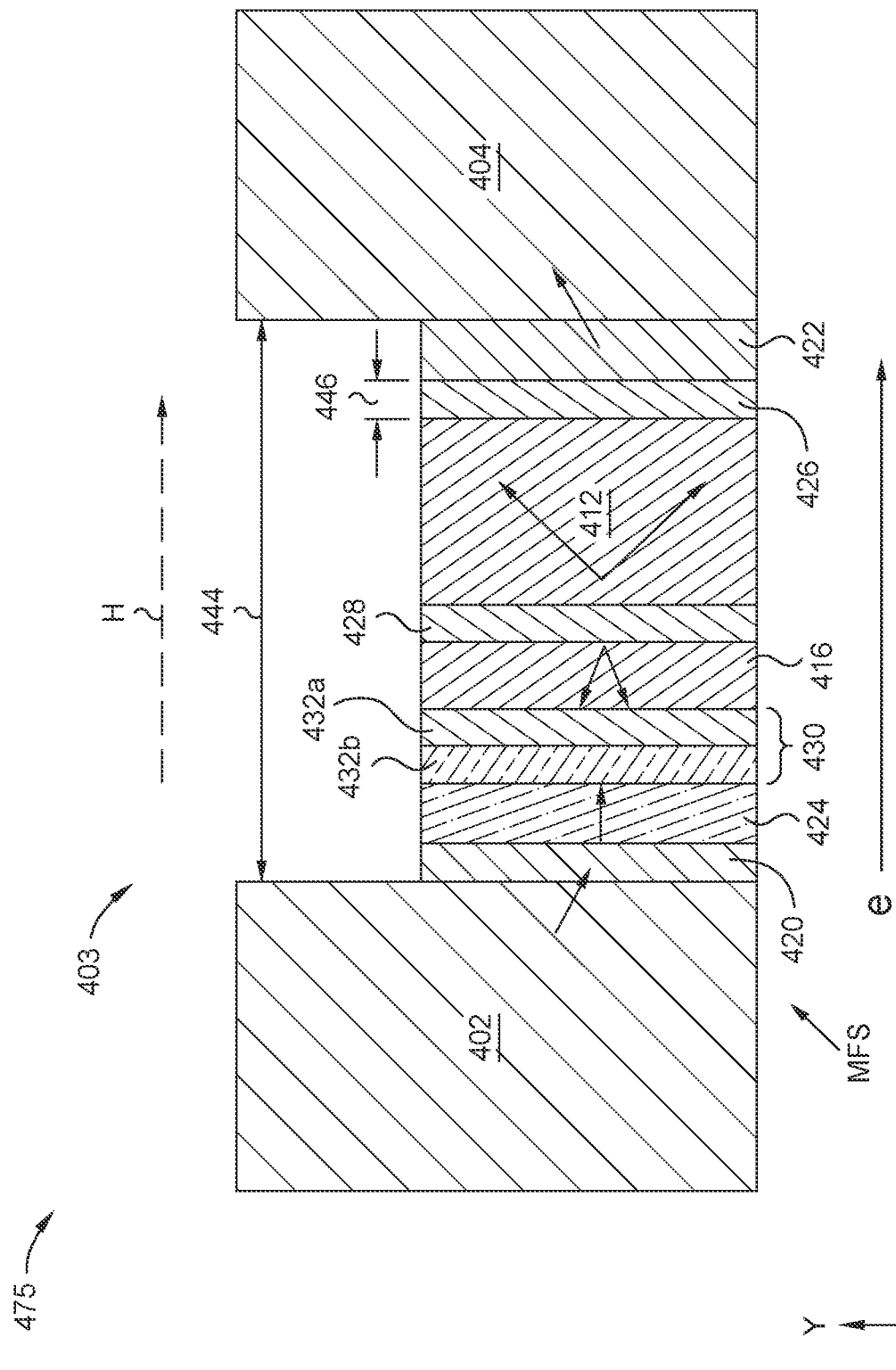

The spintronic devices 400 and 425 of FIGS. 4A-4B are forward stack configurations, and the spintronic devices 450, 475 of FIGS. 4C-4D are reverse stack configurations. The arrows shown within each layer of the spintronic devices 400, 425, 450, 475 represent the magnetization direction of the layer.

The spintronic device 400 of FIG. 4A comprises an optional first notch 422 disposed on the main pole 402, a first spacer layer 426 disposed on the optional first notch 422 or on the main pole 402, a FGL 412 disposed on the first spacer layer 426, a second spacer layer 428 disposed on the FGL 412, a STL 416 disposed on the second spacer layer 428, a third spacer layer 430 disposed on the STL 416, a negative polarization layer (NPL) 424 disposed on the third spacer layer 430, and a second notch 420 disposed in contact with the NPL 424 and the shield 404. In some embodiments, the first notch 422 is considered a part of the main pole 402, and the second notch 420 is considered a part of the shield 404.

The first spacer layer 426, the second spacer layer 428, and the third spacer layer 430 may each individually comprise a non-magnetic layer, such as Cu, Ru, or a combination of Cu, Ru, and/or Cr. The first spacer layer 426 and the second spacer layer 428 each has a thickness in the x-direction of about 2 nm to about 5 nm. The third spacer layer 430 has a thickness in the x-direction of about 2 nm to about 5 nm. The FGL 412 comprises a magnetic material, such as CoFe and/or a Co/Fe multilayer, and has a thickness in the x-direction of about 5 nm to about 10 nm. The STL 416 comprises a magnetic material, such as CMG and/or NiFe, and has a thickness in the x-direction of about 4 nm to about 6 nm. The NPL 424 comprises a material having a negative polarization, such as FeCr, and has a thickness in the x-direction of about 5 nm. The second notch 420 comprises a magnetic material, such as CoFeNi or other suitable magnetic materials, and has a thickness in the x-direction of about 2 nm to about 5 nm. The first notch 422 comprises a high moment magnetic material, such as CoFe, and has a thickness in the x-direction of about 2 nm to about 5 nm.

The spintronic device 425 of FIG. 4B is the same as the spintronic device 400 of FIG. 4A; however, the third spacer layer 430 comprises a first sublayer 432a disposed in contact with the STL 416 and a second sublayer 432b disposed in contact with the NPL 424. The first sublayer 432a may comprise Cu and have a thickness in the x-direction of about 1 nm to about 3 nm. The second sublayer 432b may comprise Cr and/or Ru and have a thickness in the x-direction of about 1 nm to about 3 nm. Thus, the third spacer layer 430 has a total thickness in the x-direction of about 2 nm to about 6 nm.

Each spintronic device 400, 425 individually has a length 440 in the x-direction from the main pole 402 to the shield 404 of about 17 nm to about 21 nm. The FGL 412 of each spintronic device 400, 425 is spaced a distance 442 from the main pole 402 in the x-direction of about 2 nm to about 3 nm. In each spintronic device 400, 425, during operation when current is applied, electrons flow from the shield 404, through either spintronic device 400 or 425, to the main pole 402. The magnetic gap field (H) is directed from the main pole 402, through either spintronic device 400 or 425, to the shield 404.

Comparing the spintronic devices 400, 425, to the conventional spintronic devices 300, 350 of FIGS. 3A-3B, the FGL 412 of each spintronic device 400, 425 is spaced about 7 nm to about 8 nm closer to the main pole 402 than the FGL 312 of either spintronic device 300, 350 is spaced to the main pole 302. As such, the FGL 412 is in a more favorable location than the FGL 312, and thus, the FGL 412 is more effective than the FGL 312, as the FGL 312 being near the center of the spintronic device 300 or 350 can degrade the gradient. By having the FGL 412 closer to the main pole 402, the AC field generated is closer to a trailing edge of the main pole 402, which is more effective for a MAMR effect gain. Similarly, the STL 416 is disposed closer to a center of the gap 403, which is an optimal location for the STL 416, as the STL 416 provides a DC assist, providing a dynamic DC field compensation, and further applies torque to the FGL 412.

The spintronic device 450 of FIG. 4C is similar to the spintronic device 400 of FIG. 4A; however, the positioning of the various layers are different. In the spintronic device 450, the NPL 424 is disposed on the second notch 420 or the main pole 402, the third spacer layer 430 is disposed on the NPL 424, the STL 416 is disposed on the third spacer layer 430, the second spacer layer 428 is disposed on the STL 416, the FGL 412 is disposed on the second spacer layer 428, the first spacer layer 426 is disposed on the FGL 412, and the first spacer layer 426 is disposed in contact with the FGL 412 and the first notch 422.

The spintronic device 475 of FIG. 4D is the same as the spintronic device 450 of FIG. 4C; however, however, the third spacer layer 430 comprises the first sublayer 432a disposed in contact with the STL 416 and the second sublayer 432b disposed in contact with the NPL 424, similar to the spintronic device 425 of FIG. 4B.

Each spintronic device 450, 475 individually has a length 444 in the x-direction from the main pole 402 to the shield 404 of about 17 nm to about 21 nm. The FGL 412 of each spintronic device 450, 475 is spaced a distance 446 from the shield 404 in the x-direction of about 2 nm to about 3 nm. In each spintronic device 450, 475, during operation when current is applied, electrons from the main pole 402, through either spintronic device 450 or 475, to the shield 404. The magnetic gap field (H) is directed from the main pole 402, through either spintronic device 450 or 475, to the shield 404.

In each spintronic device 400, 425, 450, 475, the FGL 412 provides alternating current (AC) magnetic field assist while the STL 416 provides DC assist. Rather than comprising three magnetic layers like conventional spintronic devices as shown in FIGS. 3A-3B, each spintronic device 400, 425, 450, 475 comprises only two magnetic layers, the FGL 412 and the STL 416. As compared to the STL in FIGS. 3A-3B, the STL 416, aided by the NPL 424, now has a dynamic nature that serves the functions of both generating the AC field and providing a DC field assist. In other words, the STL 416 precessing switches against the gap field and provides torque to the FGL 412, eliminating the need for the third magnetic layer.

During operation of each spintronic device 400, 425, 450, 475, the STL 416's magnetization is reversed by torques from the FGL 412 and the NPL 424. The FGL 412 has a magnetization precession at an angle of about 60 degrees to about 70 degrees (with a 0 degree reference in the positive x-direction). Thus, STL 416 of each spintronic device 400, 425, 450, 475 has a magnetization precession at an angle of about 160 degrees to about 170 degrees. The STL 416 having a higher magnetization precession angle increases the effective moment in the gap field direction (Bst; where the Bst is a product of saturation magnetization and the thickness of the STL 416 or the permeability of free space) in the gap field direction, which in turn improves the overall performance, as a larger Bst provides a larger DC field assist by the STL 416.

Comparing the spintronic devices 400, 425, 450, 475 to the conventional spintronic devices 300, 350 of FIGS. 3A-3B, the spintronic devices 400, 425, 450, 475 do not comprise a SS layer or a SPL. As such, the spintronic devices 400, 425, 450, 475 each has a total length 444 at least 5 nm to about 8 nm less than the lengths 340, 344 of the spintronic devices 300, 350.

Figure 5:
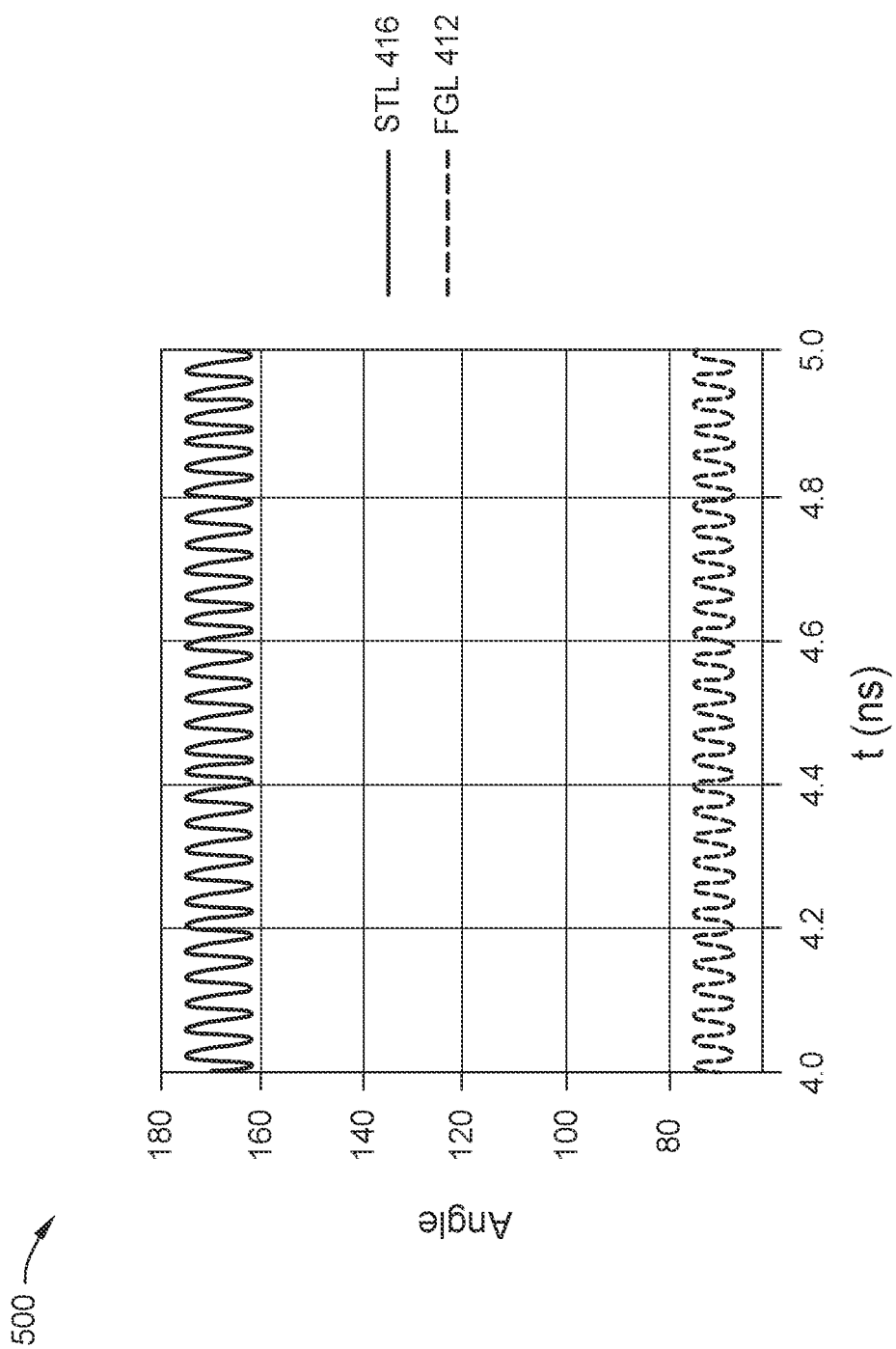
FIG. 5 is a graph illustrating the magnetization direction angles of the spin torque layer and the field generation layer of any of the spintronic devices of FIGS. 4A-4D, according to one embodiment.

FIG. 5 is a graph 500 illustrating the magnetization direction angles of the STL 416 and the FGL 412 of any of the spintronic devices 400-475 of FIGS. 4A-4D, according to one embodiment. The graph 500 shows the angle in degrees versus time in ns (i.e., the amount of time current flowed through the spintronic devices 400-475).

The graph 500 shows that the STL 416 having a Bst of about 5.2 T*nm can operate at an average angle of about 170 degrees, where the generated field strength is proportional to the Bst times cosine (170). The STL 416 is able to achieve the 170 degree angle due, at least in part, to assistance from the NPL 424. The FGL 412 can operate an average angle of about 62 degrees at a frequency of about 28 GHZ. Furthermore, as shown in the graph, the STL 416 and the FGL 412 are able to maintain their respective angles over time without distorting. The angles of the STL 416 and the FGL 412 further increase a combined effective magnetic field of the main pole 402 and the spintronic devices 400-475 of FIGS. 4A-4D by about 400 Oe and the total field gradient by about 100 Oe/nm.

Therefore, spintronic devices comprising a FGL disposed near the main pole, a STL disposed near the center of the gap, and a negative polarization layer disposed near the shield having a reduced length in the gap, in turn decreasing the size of the gap between the main pole and the shield. Moreover, such spintronic devices are able to increase the magnetization precession angle of the STL, achieving a larger Bst, where the Bst is a product of saturation magnetization and the thickness of the STL or the permeability of free space, in the gap field direction, which results in the overall performance of each spintronic device being improved.

In one embodiment, a magnetic recording head comprises a main pole, a shield, and a spintronic device is disposed between a main pole and a shield, the spintronic device comprising a field generation layer (FGL) spaced a distance of about 2 nm to about 3 nm from the main pole, a first spacer layer disposed in contact with the FGL, a spin torque layer (STL) disposed in contact with the first spacer layer, and a negative polarization layer (NPL) disposed between the STL and the shield, the NPL comprising a negative polarization material.

The spintronic device has a length of about 17 nm to about 21 nm. The spintronic device further comprises a second spacer layer disposed between and in contact with the STL and the NPL. The second spacer layer comprises a first sublayer disposed in contact with the STL and a second sublayer disposed in contact with the NPL. The spintronic device further comprises a first notch disposed on the main pole, a third spacer layer disposed in contact with the first notch and the FGL, and a second notch disposed between and in contact with the NPL and the shield. The NPL comprises FeCr, and wherein the first notch comprises CoFe. A magnetic recording head comprises the spintronic device. A magnetic recording system comprises the magnetic recording head. During operation, a current is configured to flow electrons from the shield through the spintronic device to the main pole, and the STL is configured to apply torque to the FGL and to provide a direct current assist to enhance a recording field during operation.

In another embodiment, a magnetic recording head comprises a main pole, a shield disposed adjacent to the main pole, and a spintronic device disposed between the main pole and the shield, the spintronic device comprising: a first spacer layer disposed adjacent to the main pole, a field generation layer (FGL) disposed on the first spacer layer, a second spacer layer disposed on the FGL, a spin torque layer (STL) disposed on the second spacer layer, a third spacer layer disposed on the STL, and a negative polarization layer (NPL) disposed between the third spacer layer and the shield, the NPL comprising FeCr, wherein the spintronic device has a length of about 17 nm to about 21 nm.

The magnetic recording head further comprises a first notch disposed between and in contact with the main pole and the first spacer layer, the first notch comprising a high moment magnetic material, and a second notch disposed between and in contact with the NPL and the shield, the second notch comprising a magnetic material. The third spacer layer comprises Cu, Ru, or a combination of one or more of Cu, Ru, and Cr. The third spacer layer comprises a first sublayer and a second sublayer. The first spacer layer has a thickness of about 2 nm to about 3 nm. A magnetic recording system comprises the magnetic recording head. The magnetic recording system is configured to apply a current to the magnetic recording head such that electrons flow from the shield, through the spintronic device, to the main pole. The STL is configured to apply torque to the FGL and to provide a direct current assist to enhance a recording field during operation In yet another embodiment, a magnetic recording head comprises a main pole, a shield disposed adjacent to the main pole, and a spintronic device disposed between the main pole and the shield, the spintronic device comprising: a first notch disposed on the main pole, a negative polarization layer (NPL) disposed on the first notch, the NPL comprising FeCr, a first spacer layer disposed on the NPL, a spin torque layer (STL) disposed on the first spacer layer, a second spacer layer disposed on the STL, a field generation layer (FGL) disposed on the second spacer layer, a third spacer layer disposed on the FGL, and a second notch disposed between and in contact with the third spacer layer and the shield.

The first spacer layer comprises a first sublayer and a second sublayer, the first and second sublayer each individually comprising Cu, Ru, or a combination of one or more of Cu, Ru, and Cr. The spintronic device has a length of about 17 nm to about 21 nm, and wherein the third spacer layer has a thickness of about 2 nm to about 3 nm. The first notch comprises a magnetic material and the second notch comprises CoFe. A magnetic recording system comprises the magnetic recording head. The magnetic recording system is configured to apply a current to the magnetic recording head such that electrons flow from the main pole, through the spintronic device, to the shield.

While the foregoing is directed to embodiments of the present disclosure, other and further embodiments of the disclosure may be devised without departing from the basic scope thereof, and the scope thereof is determined by the claims that follow.

What is claimed is:

1. A magnetic recording head comprising;
   a main pole;
   a shield; and
   a spintronic device disposed between the main pole and the shield, the spintronic device comprising:
      a field generation layer (FGL) spaced a distance of about 2 nm to about 3 nm from the main pole;
      a first spacer layer disposed in contact with the FGL;
      a spin torque layer (STL) disposed in contact with the first spacer layer;
      a negative polarization layer (NPL) disposed between the STL and the shield, the NPL comprising a negative polarization material; and
      a first notch disposed between and in contact with the NPL and the shield, wherein the NPL comprises FeCr, and wherein the first notch comprises CoFe.

2. The magnetic recording head of claim 1, wherein the spintronic device has a length of about 17 nm to about 21 nm.

3. The magnetic recording head of claim 1, wherein the spintronic device further comprises a second spacer layer disposed between and in contact with the STL and the NPL.

4. The magnetic recording head of claim 1, wherein the spintronic device further comprises:
   a second notch disposed on the main pole; and
   a third spacer layer disposed in contact with the second notch and the FGL.

5. A magnetic recording system comprising the magnetic recording head of claim 1.

6. The magnetic recording system of claim 5, wherein during operation, the magnetic recording system is configured to apply a current to the magnetic recording head such that electrons flow from the shield, through the spintronic device, to the main pole, and wherein the STL is configured to apply torque to the FGL and to provide a direct current assist to enhance a recording field during operation.

7. A magnetic recording head comprising;
   a main pole;
   a shield; and
   a spintronic device disposed between the main pole and the shield, the spintronic device comprising:
      a field generation layer (FGL) spaced a distance of about 2 nm to about 3 nm from the main pole;
      a first spacer layer disposed in contact with the FGL;
      a spin torque layer (STL) disposed in contact with the first spacer layer; and
      a negative polarization layer (NPL) disposed between the STL and the shield, the NPL comprising a negative polarization material, wherein the spintronic device further comprises a second spacer layer disposed between and in contact with the STL and the NPL, and wherein the second spacer layer comprises a first sublayer disposed in contact with the STL and a second sublayer disposed in contact with the NPL.

8. A magnetic recording head, comprising:
   a main pole;
   a shield disposed adjacent to the main pole; and
   a spintronic device disposed between the main pole and the shield, the spintronic device comprising:
      a first spacer layer disposed adjacent to the main pole;
      a field generation layer (FGL) disposed on the first spacer layer;
      a second spacer layer disposed on the FGL;
      a spin torque layer (STL) disposed on the second spacer layer;
      a third spacer layer disposed on the STL;
      a negative polarization layer (NPL) disposed between the third spacer layer and the shield, the NPL comprising FeCr, wherein the spintronic device has a length of about 17 nm to about 21 nm,
      a first notch disposed between and in contact with the main pole and the first spacer layer, the first notch comprising a high moment magnetic material; and
      a second notch disposed between and in contact with the NPL and the shield, the second notch comprising a magnetic material.

9. The magnetic recording head of claim 8, wherein the third spacer layer comprises Cu, Ru, or a combination of one or more of Cu, Ru, and Cr.

10. The magnetic recording head of claim 8, wherein the third spacer layer comprises a first sublayer and a second sublayer.

11. The magnetic recording head of claim 8, wherein the first spacer layer has a thickness of about 2 nm to about 3 nm.

12. A magnetic recording system comprising the magnetic recording head of claim 8.

13. The magnetic recording system of claim 12, wherein the magnetic recording system is configured to apply a current to the magnetic recording head such that electrons flow from the shield, through the spintronic device, to the main pole.

14. The magnetic recording system of claim 13, wherein the STL is configured to apply torque to the FGL and to provide a direct current assist enhance a recording field during operation.

15. A magnetic recording head, comprising:
   a main pole;
   a shield disposed adjacent to the main pole; and a spintronic device disposed between the main pole and the shield, the spintronic device comprising:
- a first spacer layer disposed adjacent to the main pole;
- a field generation layer (FGL) disposed on the first spacer layer;
- a second spacer layer disposed on the FGL;
- a spin torque layer (STL) disposed on the second spacer layer;
- a third spacer layer disposed on the STL, wherein the third spacer layer comprises a first sublayer and a second sublayer; and
- a negative polarization layer (NPL) disposed between the third spacer layer and the shield, the NPL comprising FeCr, wherein the spintronic device has a length of about 17 nm to about 21 nm.

16. The magnetic recording head of claim 15, wherein the third spacer layer comprises Cu, Ru, or a combination of one or more of Cu, Ru, and Cr.

17. The magnetic recording head of claim 15, wherein the first spacer layer has a thickness of about 2 nm to about 3 nm.

18. A magnetic recording system comprising the magnetic recording head of claim 15.

19. The magnetic recording system of claim 18, wherein the magnetic recording system is configured to apply a current to the magnetic recording head such that electrons flow from the shield, through the spintronic device, to the main pole.

20. The magnetic recording system of claim 19, wherein the STL is configured to apply torque to the FGL and to provide a direct current assist enhance a recording field during operation.

* * * * *